(12) United States Patent
Morrison et al.

(10) Patent No.: US 11,561,583 B2
(45) Date of Patent: Jan. 24, 2023

(54) INFORMATION HANDLING SYSTEM WITH SCROLLING EXPANDABLE DISPLAY

(71) Applicant: DELL PRODUCTS, LP, Round Rock, TX (US)

(72) Inventors: John T. Morrison, Round Rock, TX (US); Chiu-Jung Tsen, Hsinchu (TW); Yi-Te Chih, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 17/167,453

(22) Filed: Feb. 4, 2021

(65) Prior Publication Data
US 2022/0244760 A1 Aug. 4, 2022

(51) Int. Cl.
  *G06F 1/16* (2006.01)
  *G09G 3/00* (2006.01)
  *G09G 5/391* (2006.01)
  *H04M 1/02* (2006.01)

(52) U.S. Cl.
  CPC .......... *G06F 1/1652* (2013.01); *G06F 1/1624* (2013.01); *G06F 1/1637* (2013.01); *G06F 1/1641* (2013.01); *G09G 3/035* (2020.08); *G09G 5/391* (2013.01); *H04M 1/0237* (2013.01); *H04M 1/0268* (2013.01); *G09G 2380/02* (2013.01)

(58) Field of Classification Search
  CPC .... G06F 1/1652; G06F 1/1624; G06F 1/1681; G06F 1/1656; G06F 1/1641; G06F 1/1643; G06F 1/1601; G06F 1/1637; G06F 1/1675; G06F 1/16; G06F 1/1615; G06F 1/1616; H04M 1/0237; H04M 1/0268; G09G 3/035; G09G 2380/02
  See application file for complete search history.

(56) References Cited

U.S. PATENT DOCUMENTS

| | | | |
|---|---|---|---|
| 8,379,377 B2 * | 2/2013 | Walters | G06F 1/1652 361/679.04 |
| 9,204,565 B1 * | 12/2015 | Lee | E05F 1/1016 |
| 10,015,897 B1 * | 7/2018 | Hong | G06F 1/1681 |
| 10,193,085 B2 * | 1/2019 | Yang | C07D 401/10 |
| 10,254,803 B1 | 4/2019 | Quinn et al. | |
| 10,868,897 B2 * | 12/2020 | Cha | H04M 1/0268 |
| 11,330,089 B2 * | 5/2022 | Lim | G06F 1/1624 |
| 2009/0051830 A1 * | 2/2009 | Matsushita | G06F 1/1652 361/679.05 |
| 2013/0021762 A1 * | 1/2013 | van Dijk | G09F 9/301 361/749 |

(Continued)

*Primary Examiner* — Dismery Mercedes
(74) *Attorney, Agent, or Firm* — Larson Newman, LLP

(57) ABSTRACT

A display device for an information handling system includes a flexible display screen, a display holder, and a sliding frame component. The flexible display screen is able to be adjusted in between multiple sizes. The display holder includes first and second foldable portions located on distal ends of the display holder. The sliding frame component adjusts the size of the flexible display screen. The sliding frame component includes first and second sliding frames, and a gear. The first sliding frame includes a first adjustment component, and the second sliding frame includes a second adjustment component. The gear is located in between the first and second adjustment components, and guides the first and second sliding frames.

16 Claims, 11 Drawing Sheets

(56) References Cited

U.S. PATENT DOCUMENTS

| | | | |
|---|---|---|---|
| 2015/0116364 A1 | 4/2015 | Aurongzeb et al. | |
| 2015/0241925 A1* | 8/2015 | Seo | G06F 1/1681 |
| | | | 361/679.27 |
| 2016/0147327 A1* | 5/2016 | Choi | G06F 1/1652 |
| | | | 345/173 |
| 2018/0077808 A1* | 3/2018 | Seo | G06F 3/044 |
| 2020/0225711 A1* | 7/2020 | Pelissier | G06F 1/1624 |
| 2020/0372875 A1 | 11/2020 | Iyer et al. | |
| 2020/0379516 A1* | 12/2020 | Park | G06F 1/1677 |
| 2022/0122514 A1* | 4/2022 | Kwon | G09G 3/2096 |
| 2022/0124923 A1* | 4/2022 | Zhang | G06F 1/1616 |
| 2022/0148477 A1* | 5/2022 | Han | H05K 5/0017 |
| 2022/0210930 A1* | 6/2022 | Wen | H05K 5/0217 |

* cited by examiner

INFORMATION HANDLING SYSTEM WITH SCROLLING EXPANDABLE DISPLAY

FIELD OF THE DISCLOSURE

The present disclosure generally relates to information handling systems, and more particularly relates to a scrolling expandable display.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A display device for an information handling system includes a flexible display screen, a display holder, and a sliding frame component. The flexible display screen may be able to be adjusted in between multiple sizes. The display holder includes first and second foldable portions located on distal ends of the display holder. The sliding frame component may adjust the size of the flexible display screen. The sliding frame component includes first and second sliding frames, and a gear. The first sliding frame includes a first adjustment component, and the second sliding frame includes a second adjustment component. The gear is located in between the first and second adjustment components, and may guide the first and second sliding frames.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
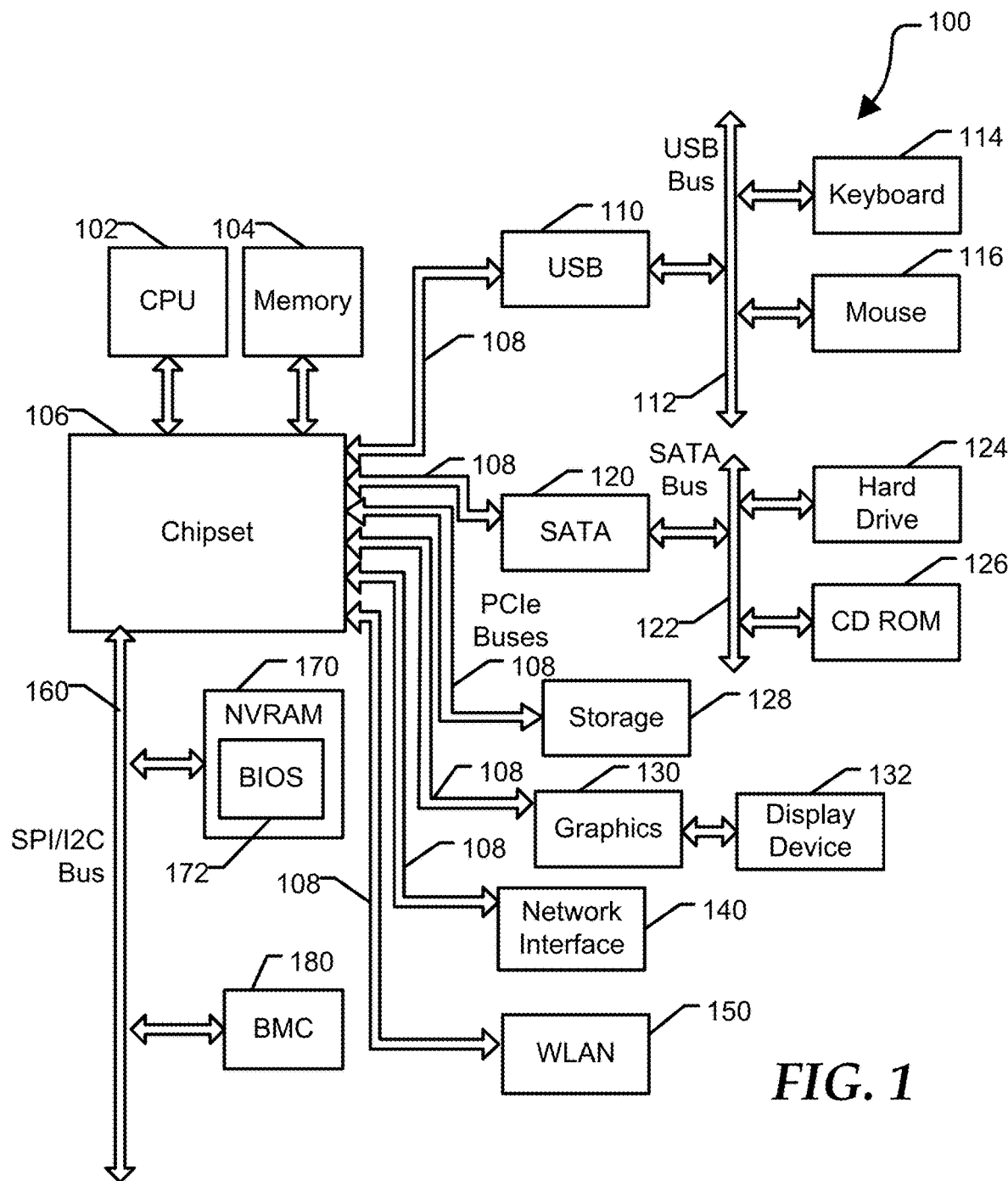
FIG. 1 is a block diagram of a general information handling system according to at least one embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
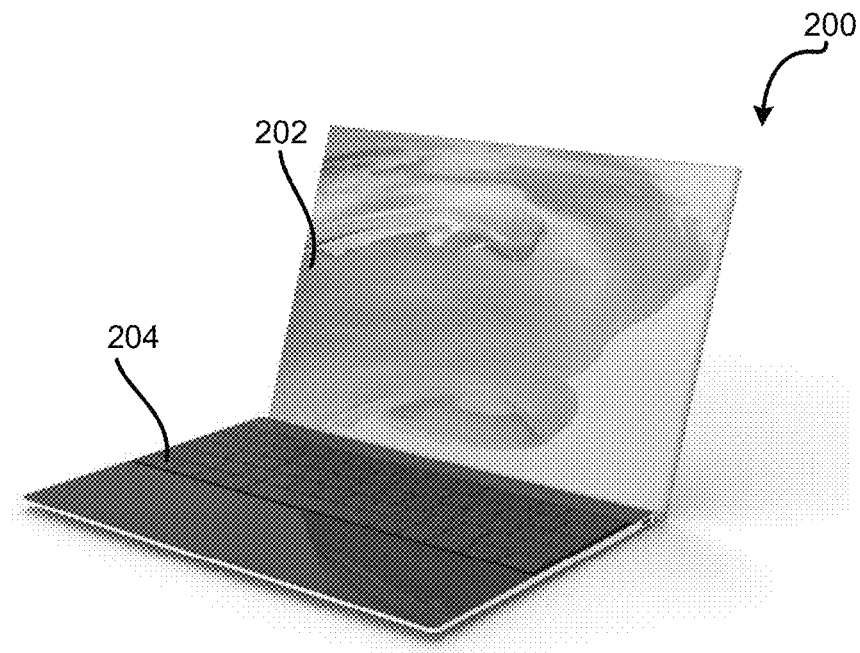
FIG. 2 is a diagram of an information handling system with a display screen at a normal width according to at least one embodiment of the disclosure.

In an example, information handling system 100 may be any suitable device including, but not limited to, compute device 202 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

Figure 3:
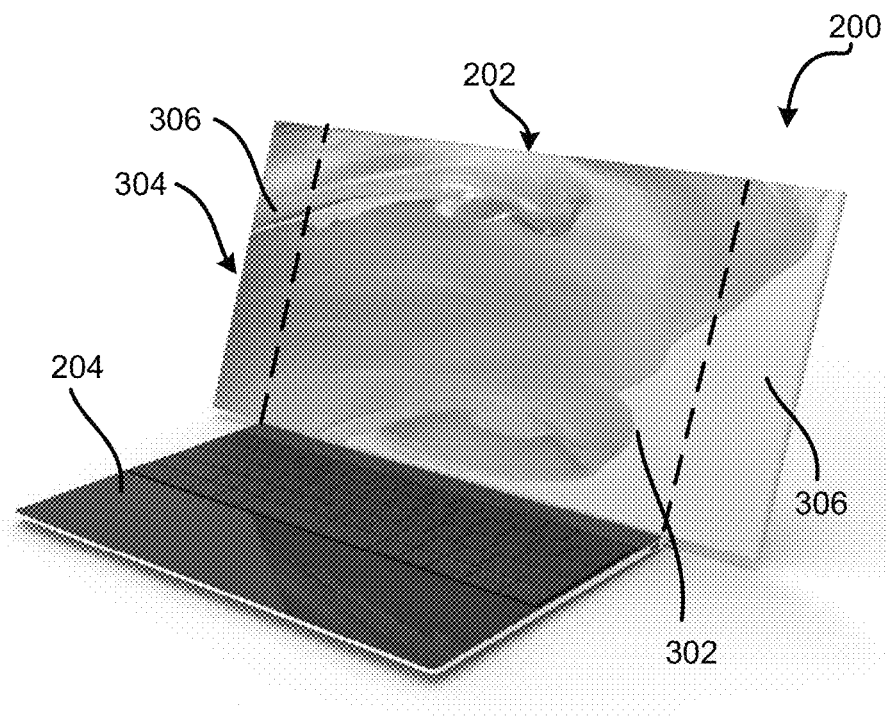
FIG. 3 is a diagram of the information handling system with the display screen at an expanded width according to at least one embodiment of the disclosure.

FIGS. 2 and 3 illustrate an information handling system 200 with a display screen 202 and an input device 204 according to at least one embodiment of the disclosure. As shown in FIG. 1, display screen 202 may be at a normal width. In an example, the normal width may be any suitable width including, but not limited to, the width of input device 204. The normal width for display screen 202 may be associated with any particular aspect ratio including, but not limited to, 16:10. In certain examples, input device 204 may be any suitable device including, but not limited, a keyboard, a pointing device, and a combination keyboard and pointing device. The pointing device may be a track pad or any type of pointing device.

Referring now to FIG. 3, display screen 202 may be at an expanded width according to at least one embodiment of the disclosure. For example, display screen 202 may expand from a normal width 302 to an expanded width 304. In an example, expanded width 304 may be any particular width greater than normal width 302. For example, display screen 202 may expand from normal width 302 by a particular amount 306 on distal ends of the display screen. The expanded width for display screen 202 may be associated with any particular aspect ratio including, but not limited to, 25:10.

Figure 4:
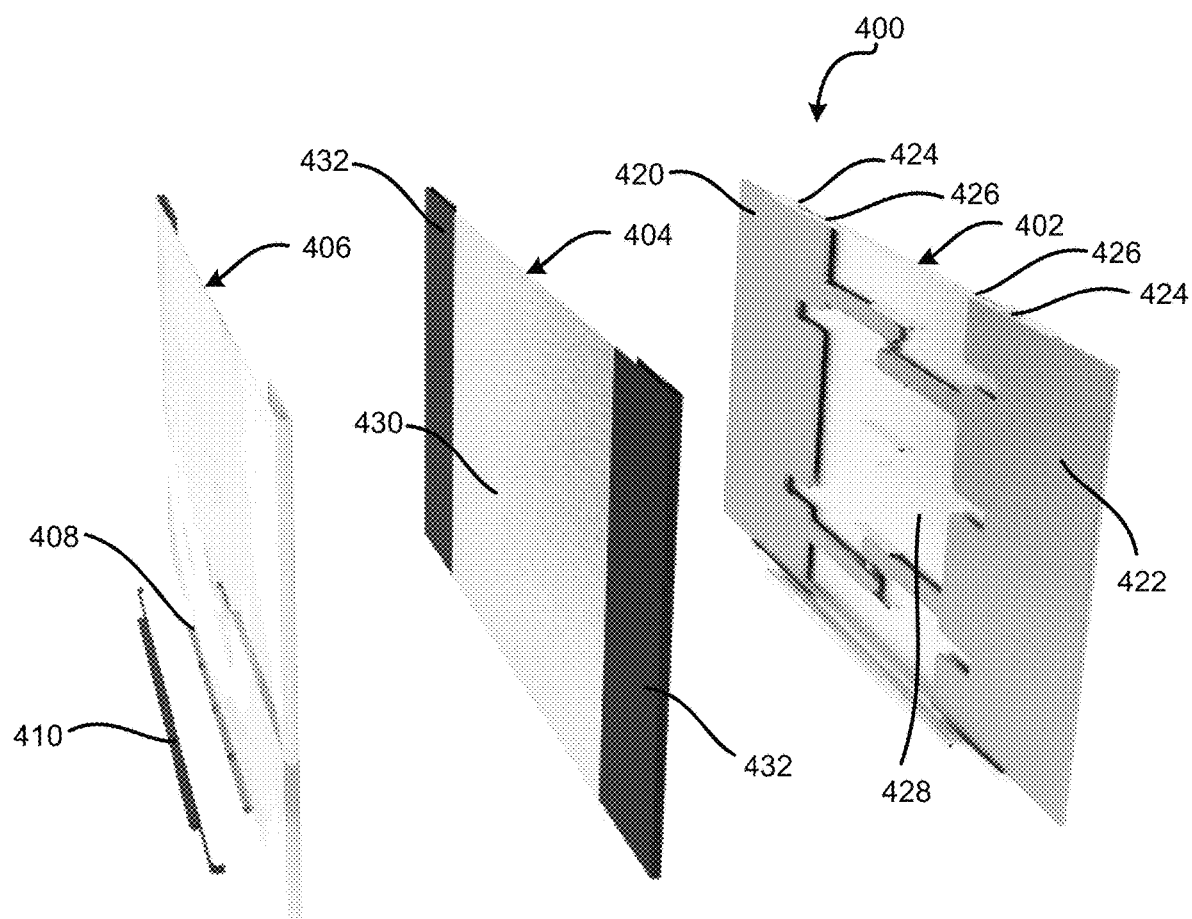
FIG. 4 is an exploded view of an expandable display screen according to at least one embodiment of the present disclosure.

FIG. 4 illustrates an expandable display device 400 according to at least one embodiment of the present disclosure. Display device 400 includes a sliding frame component 402, a display holder 404, a flexible display screen 406, a control board 408, and a bezel cover 410. Sliding frame component 402 includes sliding frames 420 and 422, push knobs 424, guide channels 426, and a cover 428. Display holder 404 includes a center frame 430 and foldable edges 432.

In an example, cover 428 may include one or more rail features, which in turn may guide movement of sliding frame components 420. In certain examples, sliding frame components 420 may be moved away from and toward a center line of cover 428. The movement of sliding frame components 420 may be performed by any suitable mechanism including, but not limited to, a user sliding push knobs 424 along guide channels 426, and a driving gear to move the sliding frame components. Sliding frame components 420 may be placed in physical communication with display holder 404. In an example, as sliding frames 420 and 422 expand and retract, foldable edges 432 of display holder 404 may similarly expand and retract.

Display holder 404 may support display screen 406. In particular, center frame 430 may provide a rigid support for display screen 406, and foldable edges 432 may provide support to the display screen as the display screen is expanded and reduced. In an example, center frame 430 may be made of any suitable rigid material including, but not limited to, metal, and a rigid plastic. Foldable edges 432 may be any suitable flexible material including, but not limited to, rubber. In certain examples, foldable edges 432 may provide flexible low friction support to display screen 406 as the display screen fold and unfolds during retraction and expansion.

In an example, display screen 406 may be made from any suitable display material including, but not limited to, a plastic organic light emitting diode (POLED) display. Control board 408 may be an electrical display board to enable images from a GPU to be displayed on display screen 406. In an example, bezel cover 410 may be placed in physical communication with control board 408 to prevent damage to the control board, and to provide a clean look to the bottom of display screen 406.

Figure 5:
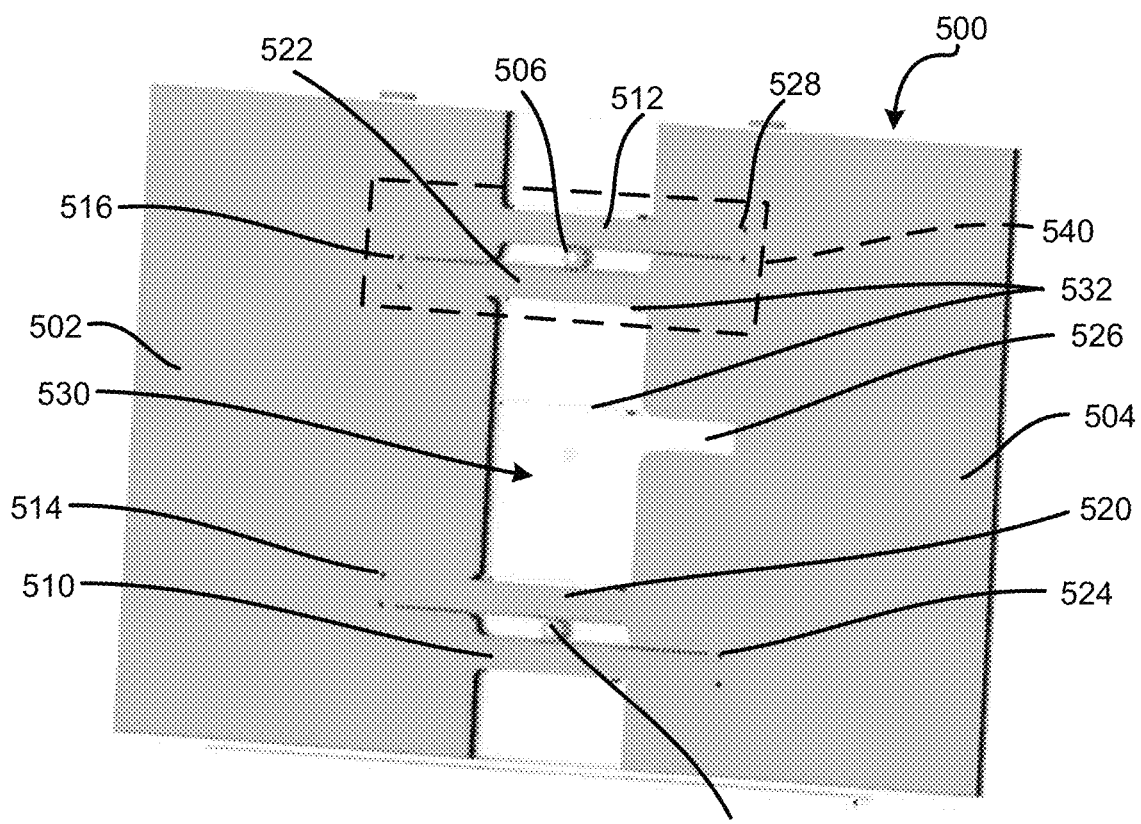
FIG. 5 is a diagram of a cover and a sliding frame component of a display device with the sliding component at a normal width according to at least one embodiment of the present disclosure.
Figure 6:
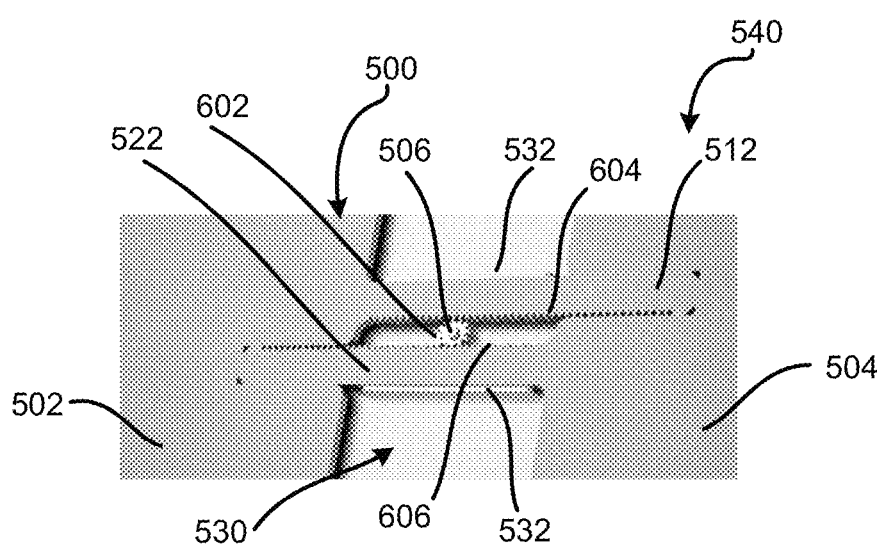
FIG. 6 is a diagram of a portion of the cover and the sliding frame component of FIG. 5 according to at least one embodiment of the present disclosure.

FIGS. 5 and 6 illustrate a sliding frame component 500 of a display device with the sliding component at a normal width according to at least one embodiment of the present disclosure. Referring now to FIG. 5, sliding frame component 500 includes sliding frames 502 and 504, and gear 506 and 508. Sliding frame 502 includes adjustment components 510 and 512, and indentions 514 and 516. Sliding frame 504 includes adjustment components 520 and 522, and indentions 524, 526, and 528. In an example, when sliding frame component 500 is at a normal width the adjustment components of one sliding frame may be fully inserted within a corresponding indention of the other sliding frame. For example, adjustment component 510 of sliding frame 502 may be fully inserted within indention 524 of sliding frame 504, and adjustment component 512 of sliding frame 502 may be fully inserted within indention 528 of sliding frame 504. Similarly, adjustment component 520 of sliding frame 504 may be fully inserted within indention 514 of sliding frame 502, and adjustment component 522 of sliding frame 504 may be fully inserted within indention 516 of sliding frame 502.

In an example, gear 506 is in physical communication with adjustment components 512 and 522, and gear 508 is in physical communication with adjustment components 510 and 520. Gears 506 and 508 may be any suitable type of gears including, but not limited to, rake and pinion gears. As sliding frames 502 and 504 expand from and extract towards a center line of the display device, gears 506 and 508 enable the sliding frames to move at substantially the same rate. In an example, if more force is exerted on one of sliding frames 502 and 504, via the knob of the sliding frame, the rotation of gears 506 and 508 keep the sliding frames moving at substantially the same rate.

The display device also includes a cover 530, which in turn includes one or more rails 532. In an example, rails 532 may interface, via physical communication, with sliding frames 502 and 504. For example, a different rail 532 of cover 530 may be placed in physical with a different adjustment component of sliding frames 502 and 504, such as adjustment component 522 is in physical communication with one of rails 532. In an example, rails 532 may keep sliding frames 502 and 504 in proper alignment with one another as the sliding frames expand from and extract towards a center line of the display device. Additional detail of a portion 540 of sliding component 500 is shown in FIG. 6.

Referring now to FIG. 6 illustrates a portion 540 of sliding frame component 500 and cover 530 of FIG. 5 according to at least one embodiment of the present disclosure. In an example, a different rail 532 of cover 530 may be placed in physical with a different adjustment component of sliding frames 502 and 504. For example, one rail 532 is placed in physical communication with adjustment component 512 of sliding frame 502, and another rail 532 is in physical communication with adjustment component 522 of sliding frame 504. As described above, rails 532 may guide adjustment components 512 and 522 to enable alignment of sliding frames 502 and 504.

In an example, gear 506 and adjustment components 512 and 522 may include one or more features for interfacing. For example, gear 506 includes multiple teeth 602, adjustment component 512 includes multiple teeth 604, and adjustment component 522 includes multiple teeth 606. In certain examples, teeth 604 and 606 may include any suitable number of teeth, and have any suitable distance between consecutive teeth. In an example, teeth 604 of adjustment component 512 and teeth 606 of adjustment component 522 may be formed with substantially the same number of teeth with substantially the same distance between consecutive teeth. As one or both of sliding frames 502 and 504 are pushed away from a center line of cover 530, teeth 602 of gear 506 may rotate and interface with teeth 604 and 606. The rotation of gear 506 and a substantially equal interface between teeth 602 and each of teeth 604 and 606 may cause sliding frames 502 to extend from or retract towards a center line of cover 530 at substantially the same rate. While the interaction between a gear and adjustment components has only been described with respect to gear 506 and adjustment components 512 and 522, gear 508 and adjustment components 512 and 522, as shown in FIG. 5, may operate substantially similar. For example, gear 508 and adjustment components 512 and 522 may include substantially similar features and may interface in substantially the same manner as described for gear 506 and adjustment components 512 and 522 without varying from the scope of this disclosure.

Figure 7:
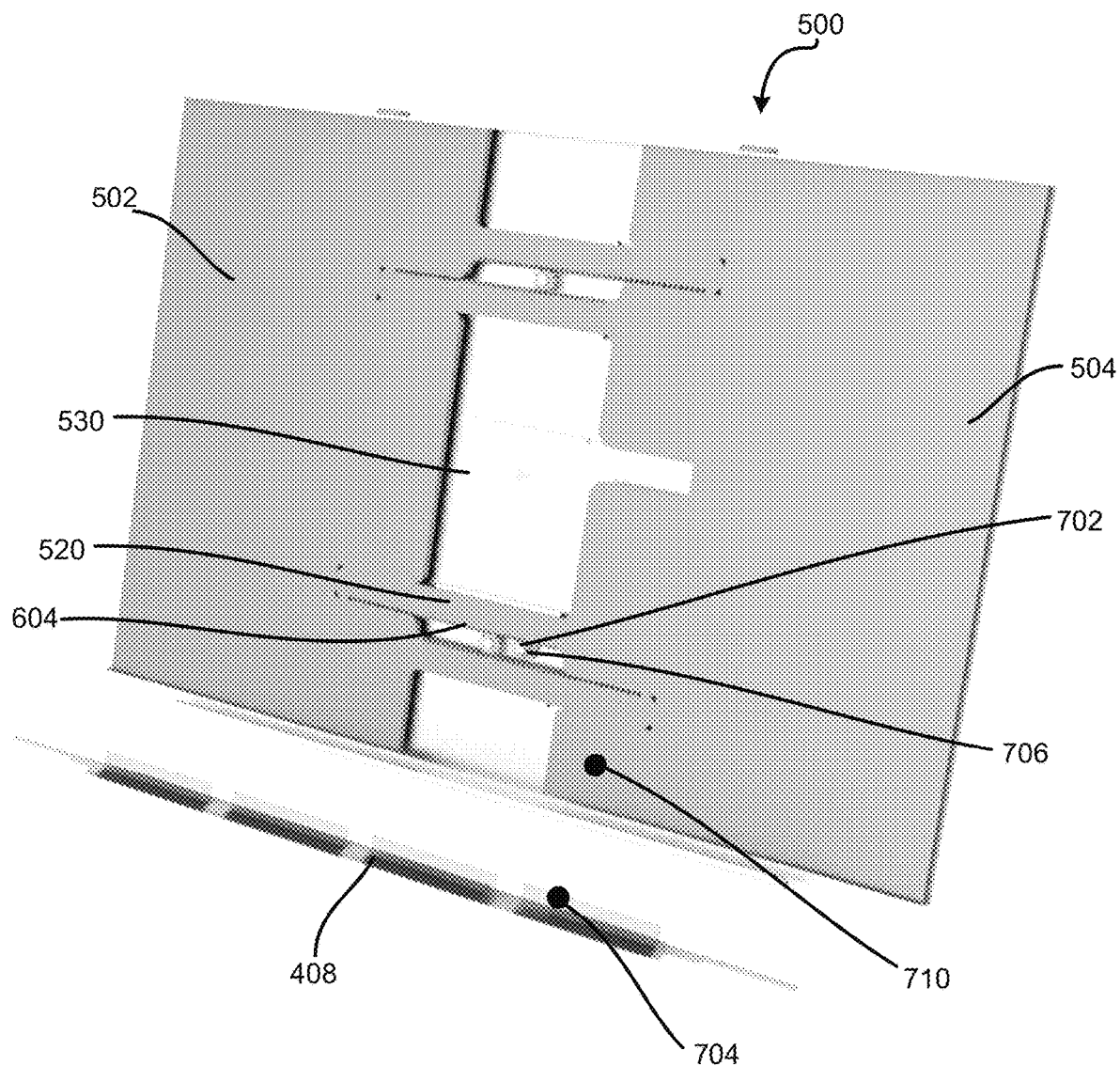
FIG. 7 is a diagram of a display device including a rotary encoder and a hall effect sensor according to at least one embodiment of the present disclosure.

FIG. 7 illustrates control board 408 and display device 500 including a rotary encoder 702 and a hall effect sensor 704 according to at least one embodiment of the present disclosure. In an example, display device 500 may include features described with respect to FIGS. 5 and 6 above including, but not limited to, sliding frames 502 and 504, adjustment component 520 with teeth 604, and cover 530. Cover 530 includes the rotary encoder 702, which includes teeth 706. One of sliding frames 502 and 504, such as sliding frame 504, includes a magnet 710.

When control board 408 is placed in physical communication with display device 500 and display device 500 is in a normal location, magnet 710 substantially aligned with hall effect sensor 704. Based on hall effect sensor 704 being substantially aligned with magnet 710, the hall effect sensor may detect and determine that display device 500 is in a full retracted position. In response to the determination that display device 500 is in the full retracted position, hall effect sensor 704 may provide a reset signal to a processor device, such as CPU 102 of FIG. 1. The processor device may reset a counter to any suitable value to reset the counter, such as a zero value. In an example, the reset value may calibrate rotary encoder 702, and the calibration may set a normal width of display device 500 and associated the normal width a standard aspect resolution, such as 16:10.

As sliding frames 502 and 504 expand from the normal width or full retracted position to any suitable expanded width or position, rotary encoder 702 may be utilized in any suitable manner to track a number of steps that display device 500 has expanded. For example, teeth 706 of rotary encoder 702 may interface with teeth 604 of adjustment controller 520 to record a display open location. Rotary encoder 702 may be gear driven paired to a pinion and as the rotary encoder rotates a number of steps is record. In an example, as teeth 604 of adjustment component 520 move away from a center line of cover 530, teeth 706 of rotary encode 702 may cause the rotary encoder to rotate, which in turn provides a count signal to the processor device. In response to receiving the count signal, the processor device may increase the counter value associated with the width of display device 500 and a corresponding display screen. The processor device may utilize the counter value to change or update the display resolution or aspect ratio for the display screen of display device 500. In an example, rotary counter 702 may an incremental or excremental counter. In response to rotary counter 702 advancing a predetermined amount of steps the counter may be at a particular value, which in turn indicates that display device 500 has reached a full expanded position. When display device 500 is in the full expanded position, the processor device may cause control board 408 to adjust or change the aspect ratio for the display screen to a maximum aspect ratio, such as a 25:10 aspect ratio.

While aspect ratios for the normal width and the expanded width of display device 500 have been disclosed, the processor device may utilize the step count from rotary encoder 702 to record any display open location in between the normal width and the expanded width, and the processor device may cause control board 408 to set the aspect ratio for the display screen according the a current display open location. When sliding frames 502 and 504 are pushed or otherwise moved from one display open location to another display open location that results in a more retracted position, the processor device may cause control board 408 reduce the aspect ratio for the display screen. In an example, when magnet 710 is substantially aligned with hall effect sensor 704, the hall effect sensor may determine that display device 500 is in the full retracting position. Based on this determination hall effect sensor 704 may provide the reset signal to the processor device, which in turn may reset the counter value. Thus, rotary encoder 702 and hall effect sensor 704 may combine to cause an aspect ratio on the display screen of display device 500 to change based on a current width of the display device.

Figure 8:
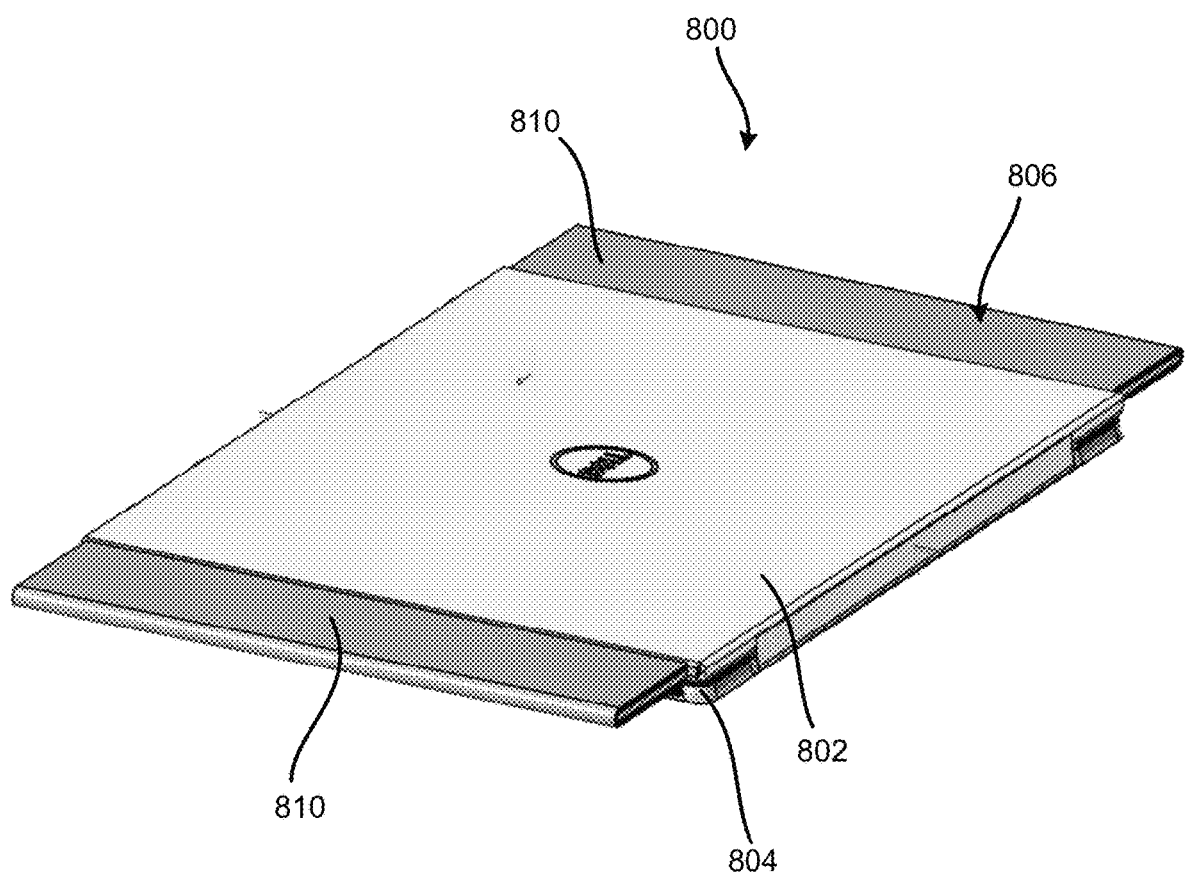
FIG. 8 is a diagram of an information handling system in a closed position with a display screen in an extended position according to at least one embodiment of the present disclosure.

FIG. 8 illustrates an information handling system 800 according to at least one embodiment of the present disclosure. Information handling system 800 includes a cover 802, an input device 804, and a display screen 806. In an example, display screen 806 may be in a full extended position as illustrated by extension portions 810 of the display screen extending beyond cover 802.

In certain examples, information handling system 800 may be placed in a closed position, such that cover 802 is shut onto input device 804. While information handling system 800 is in the closed position, display screen 806 may not have been retracted, such that extension portions 810 continue to extend past cover 802. In this example, display screen 806 may be formed from a flexible and scratch resistant material, such as POLED, so that the display screen is not damaged by being in the full extended position when information handling system 800 is closed. In an example, display screen 806 may be pushed or otherwise move from the extended position to a full retracted position while information handling system is closed without damaging the display screen.

Figure 9:
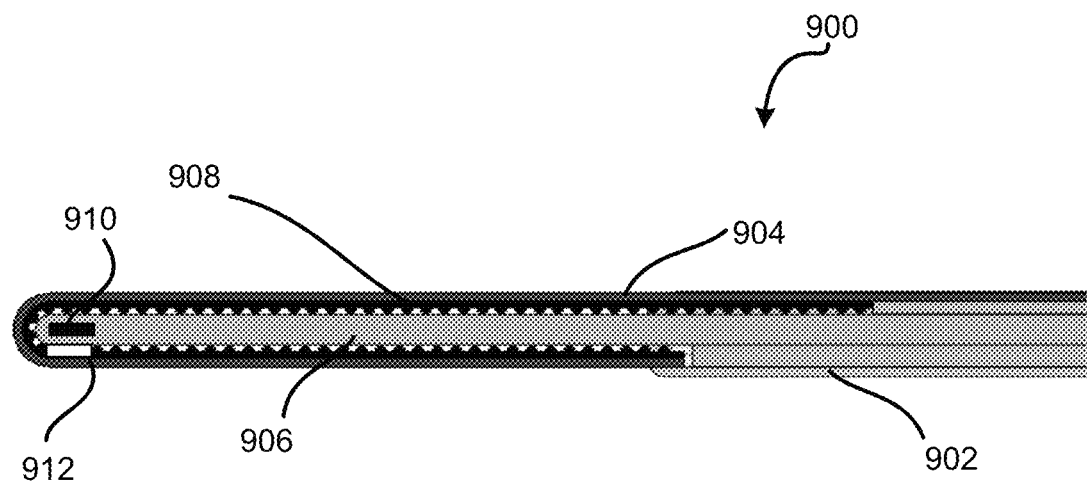
FIG. 9 is a cross sectional view of a display device in an extended position according to at least one embodiment of the present disclosure.
Figure 10:
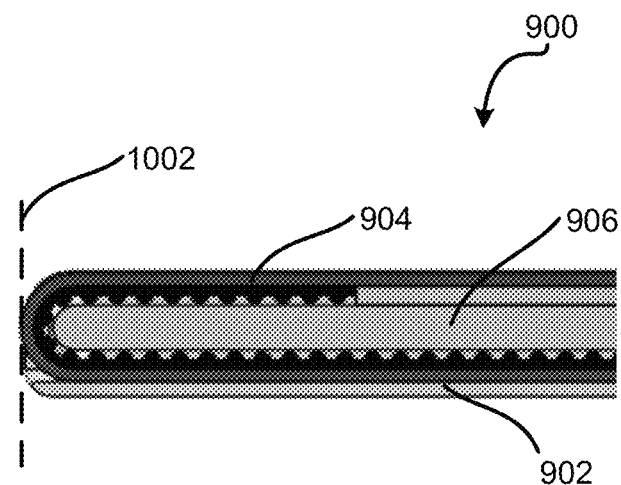
FIG. 10 is a cross sectional view of a display device in a normal position according to at least one embodiment of the present disclosure.

FIGS. 9 and 10 illustrate a portion of a display device 900 according to at least one embodiment of the present disclosure. Referring now to FIG. 9, display device 900 includes a cover 902, a display screen 904, a sliding frame component 906, and a display screen holder 908. Display screen 904 and display screen holder 808 may wrap around sliding frame component 906 with an end of the display screen and display screen holder being attached to cover 902. Sliding frame component 906 includes a stop location component 910. Display screen holder 908 includes a stop sensor 912.

As sliding frame component 906 is extended from a retracted or closed position, display screen holder 908 may slide along the sliding frame component to enable more of display screen 904 to be viewable in the front of display device 900. Display screen holder 908 may be from any suitable flexible material including, but not limited to, a smooth rubber material, such as Teflon. In an example, stop sensor 912 may move toward an end of sliding frame component 906 as the sliding frame component extends display screen holder 908 and display screen 904. In response to stop sensor 912 being substantially aligned with stop location component 910, the stop sensor may provide a stop signal to a processor device, such as CPU 102 of FIG. 1.

In response to receiving the stop signal, the processor device may perform one or more suitable operations to cause sliding component 906 to not be extended any more. For example, the processor device may provide a signal to a driving gear that may cause the driving gear to stop, which in turn may stop the extending of sliding frame component 906. In another example, the processor device may cause any suitable stop notification to be provided. In an example, the processor device may cause a control board, such as control board 408 of FIG. 4, to display a stop message on display screen 904, and the stop message may indicate to a user to that the display screen has reached its maximum width. The processor device may also provide an audible stop message, such as an audio message stating that the display screen has reached its maximum width.

Referring now to FIG. 10, display screen 904 and sliding frame component 906 are in a full retracted or normal position. In the full retracted position, display screen 904 may be located within an outer edge of cover 902 as indicated by line 1002. In an example, display screen 904 may have a particular bend radius, which may reduce a thickness of display device 900. For example, the smaller the bend radius of display screen 904, the thinner display device 900. In an example, display screen 904 may be a POLED display screen that may have a bend radius that enables display device 900 to be thinner than display devices with a fixed width display screen.

Figure 11:
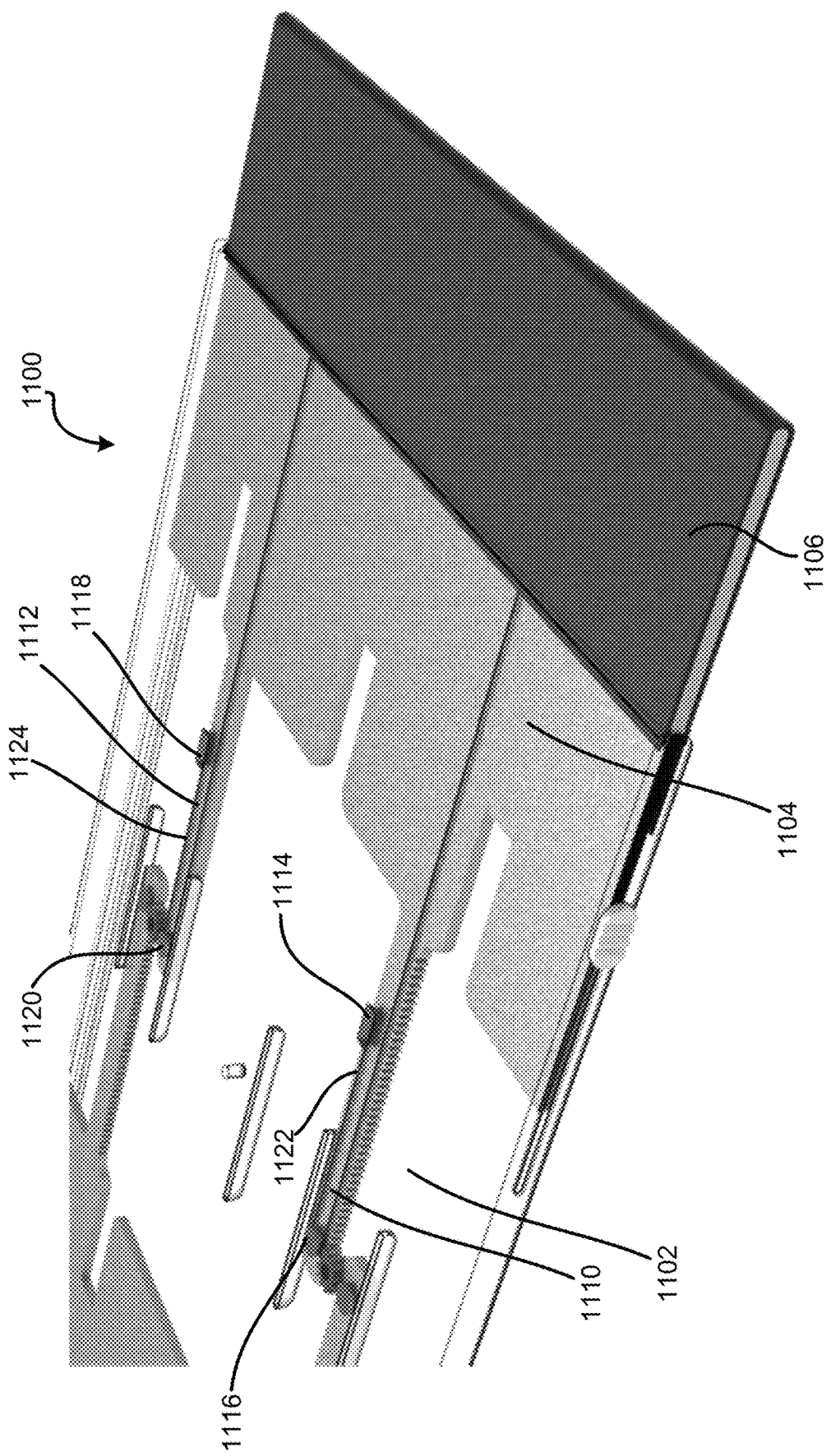
FIG. 11 is a diagram of a display device with a sliding component in an extended position according to at least one embodiment of the present disclosure.

FIG. 11 illustrates a portion of a display device 1100 according to at least one embodiment of the present disclosure. Display device 1100 includes a cover 1102, a sliding frame 1104, and a display screen holder 1106. In an example, sliding frame 1104 may be part of a sliding frame component as described in one or more of the above figures. Sliding frame 1104 includes adjustment components 1110 and 1112. A wire mount 1114 and a pulley 1116 may be in physical communication with and secured to adjustment component 1110. Similarly, a wire mount 1118 and a pulley 1120 may be in physical communication with and secured to adjustment component 1112. In an example, a wire 1122 may extend from wire mount 1114 around pulley 1116, along a channel in sliding frame 1104, molded within a flexible portion of display screen holder 1106 and connected to cover 1102. Similarly, a wire 1124 may extend from wire mount 1118 around pulley 1120, along another channel in sliding frame 1104, molded within a flexible portion of display screen holder 1106 and connected to cover 1102. In an example, wires 1122 and 1124 may be any suitable type of wire including, but not limited to, steel wires. While only a few component of display device 1100 have been shown in FIG. 11, the display device may include additional components not described with respect to FIG. 11 without varying from the scope of this disclosure.

In an example, adjustment components 1110 and 1112 may operate to enable expansion of display device 1100 in substantially the same manner as adjustment components 520 and 522 of FIG. 5. In certain examples, as sliding frame 1104 is extended away from a center line of cover 1102, wires 1122 and 1124 may maintain structure within the flexible portion of display screen holder 1106. Wires 1122 and 1124 combined with pulleys 1116 and 1120 may prevent display screen holder 1106 from provided a preloaded stress on sliding frame 1104. Based on wire 1122 extended from wire mount 1114, around pulley 1116, and through display screen holder 1106 may reduce a sliding force of sliding frame 1104 and the display screen holder. Similarly, wire 1124 extending from wire mount 1118, around pulley 1120, and through display screen holder 1106 may reduce a sliding force of sliding frame 1104 and the display screen holder.

Figure 12:
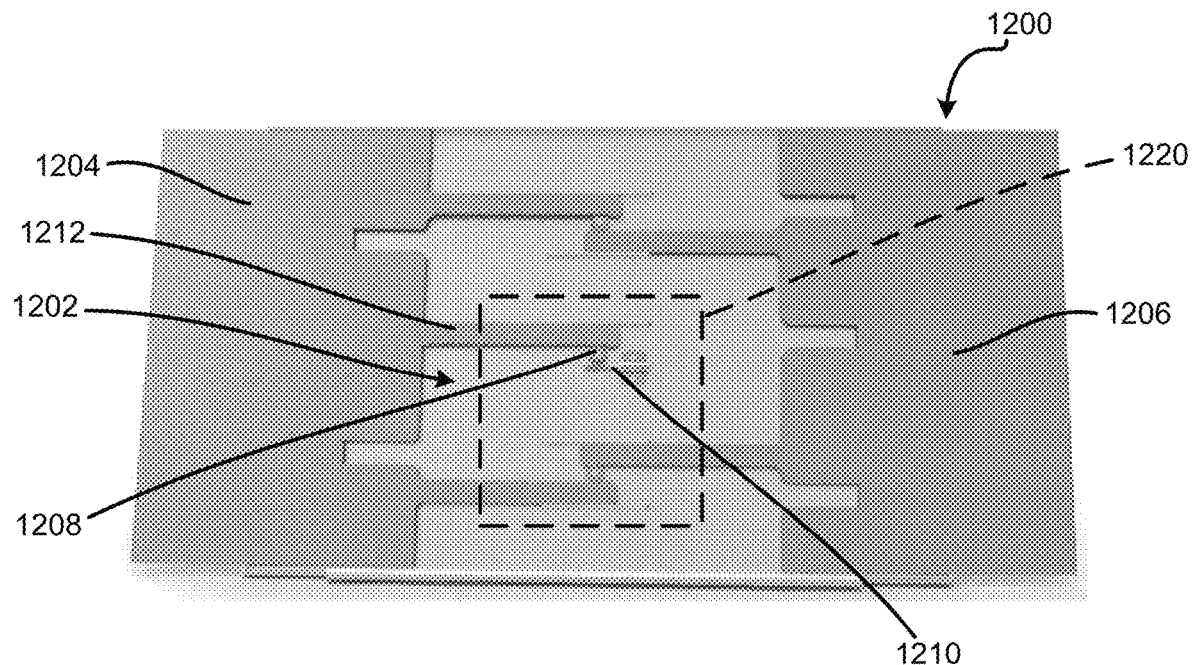
FIG. 12 is a diagram of a cover and a sliding frame component of a display device with a motor driver according to at least one embodiment of the present disclosure.
Figure 13:
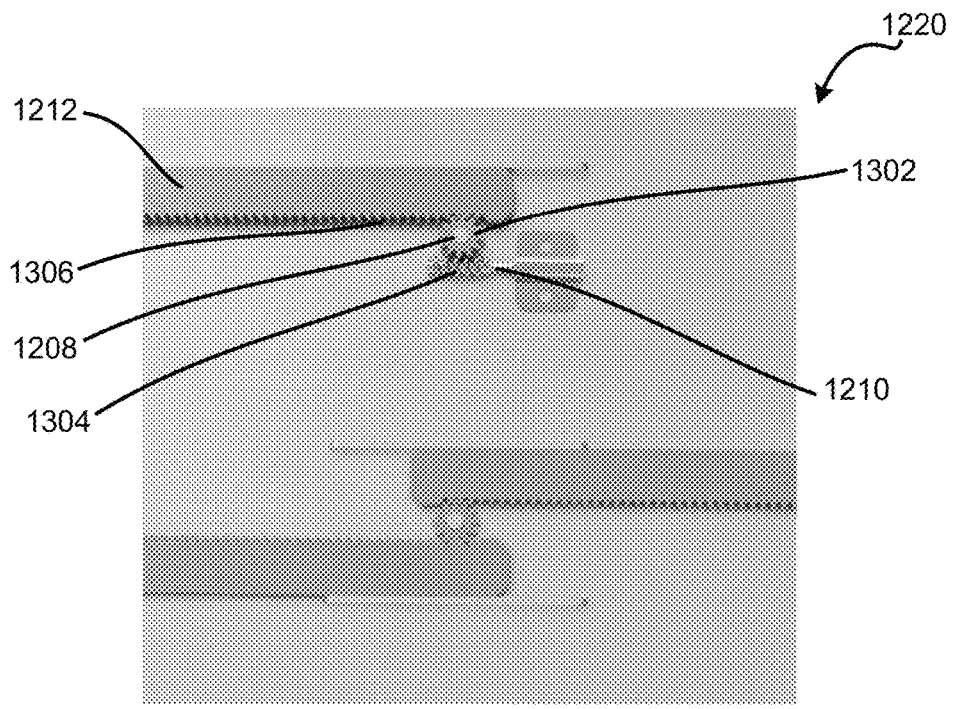
FIG. 13 is a diagram of a portion of the cover and the sliding frame component of FIG. 12 according to at least one embodiment of the present disclosure.

FIGS. 12 and 13 illustrate a portion of a display device 1200 according to at least one embodiment of the present disclosure. Referring now to FIG. 12, display device 1200 includes a cover 1202 and sliding frames 1204 and 1206. In an example, sliding frames 1204 and 1206 may be part of a sliding frame component as described in one or more of the above figures. Cover 1202 includes a gear 1208 and a driving gear 1210. Sliding frame 1204 includes an adjustment component 1210. Gear 1208 may be placed in physical communication with driving gear 1210 and adjustment component 1212. While only a few component of display device 1200 have been shown in FIG. 12 the display device may include additional components not described with respect to FIG. 12 without varying from the scope of this disclosure.

During operation of an information handling system, display device 1200 may be expanded from a full retracted or normal position to a full expanded position. In an example, driving gear 1210 may be controlled in any suitable manner including, but not limited to, a motor. In certain examples, motor may be controlled by any suitable means including, but not limited to, a signal from a button, and software executed on a processor device, such as CPU 102 of FIG. 1. The interface between driving gear 1210 and gear 1208, and between gear 1208 and adjustment component 1212 may cause display device 1200 to expand and retract.

Referring now to FIG. 13, enlarged portion 1220 illustrates gear 1208 with teeth 1302, driving gear 1210 with threads 1304, and adjustment component 1212 with teeth 1306. In an example, if a user presses a physical button on an information handling system associated with display device 1200, a signal may be provided to the motor, which in turn may cause driving gear 1210 to rotate. In certain examples, if a user adjusts a resolution or aspect ration for a display screen, software executed by the processor device may cause the motor to rotate driving gear 1210. In an example, the amount of rotation by driving gear 1210 may be determined based on a length of time a button is pressed or on the change in the resolution of the display screen.

As driving gear 1210 rotates, threads 1304 rotate and interface with teeth 1302 of gear 1208. The rotation of threads 1304 apply a force on teeth 1302, which in turn causes gear 1208 to rotate. In an example, the direction of the force applied by threads 1304 controls the direction of rotation by gear 1208. As gear 1208 rotates, teeth 1302 exert a force on teeth 1306 of adjustment component 1212 and may cause display device 1200 to expand and retract. In certain examples, the direction of the force exerted by teeth 1302 on teeth 1306 may control whether adjustment component 1212 and display device 1200 expand or retract.

Figure 14:
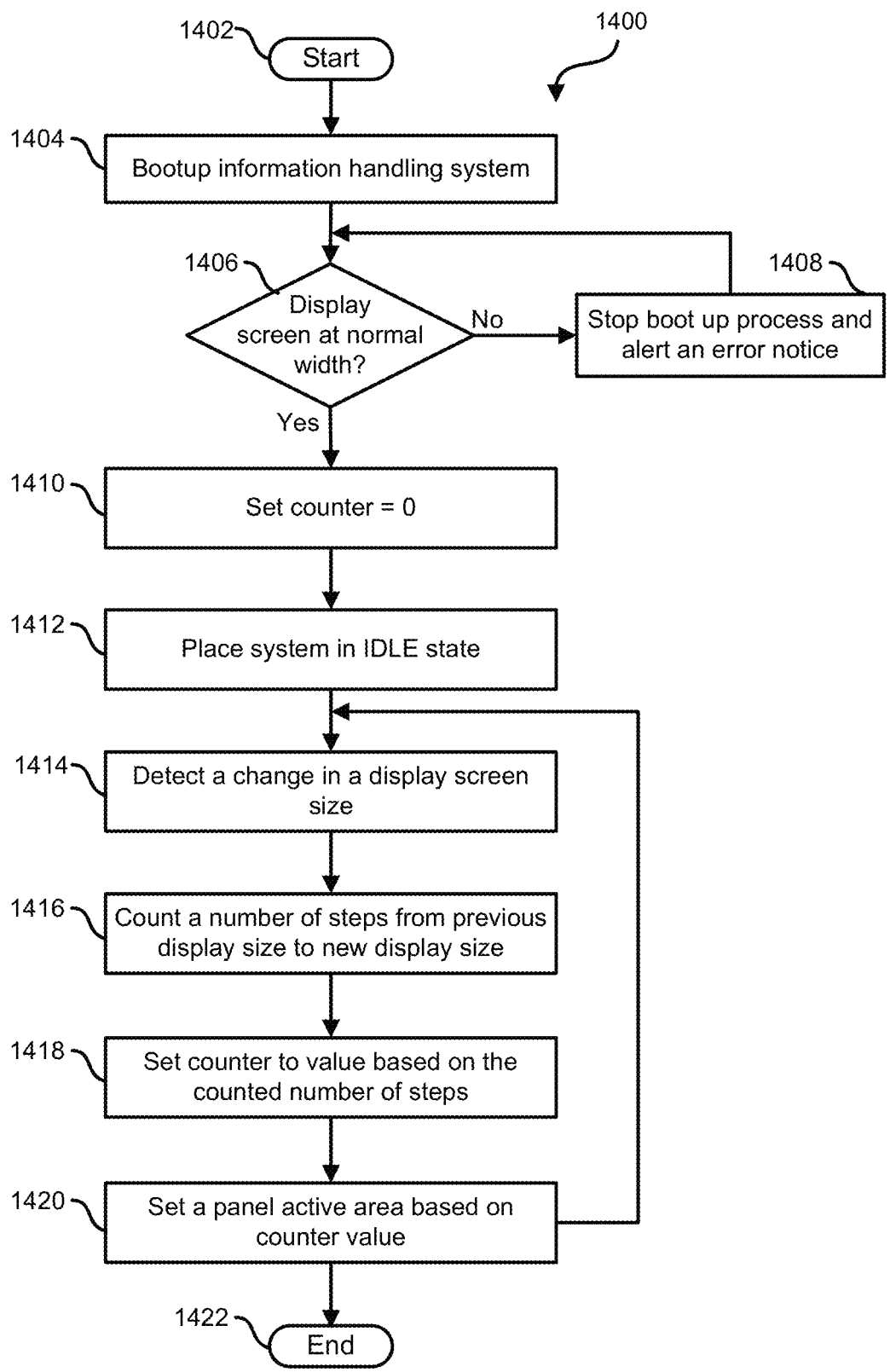
FIG. 14 is a flow diagram of a method for scrolling an expandable display screen according to at least one embodiment of the current disclosure.

FIG. 14 is a flow diagram of a method 1400 for scrolling an expandable display screen according to at least one embodiment of the current disclosure, starting at block 1402. It will be readily appreciated that not every method step set forth in this flow diagram is always necessary, and that certain steps of the methods may be combined, performed simultaneously, in a different order, or perhaps omitted, without varying from the scope of the disclosure. FIG. 14 may be employed in whole, or in part, by information handling system 100 depicted in FIG. 1 or any other type of system, controller, device, module, processor, or any combination thereof, operable to employ all, or portions of, the method of FIG. 14.

At block 1404, an information handling system is booted up. At block 1406, a determination is made whether a width of a display screen is at a normal width. In an example, the display screen may be incorporated within a display device of the information handling system. The width of the display screen may be determined in any suitable manner. For example, a status of a hall effect sensor flag may be checked to determine whether the display screen is at a normal width. In an example, the hall effect sensor flag may be set to a first value in response to a hall effect sensor being substantially aligned with a magnet on a sliding frame component, and the hall effect sensor to be set to a second value in response to the hall effect sensor not being aligned with the magnet. In certain examples, the display screen may be at a normal width when the hall effect sensor is substantially aligned with the magnet, and the display screen may be at a larger than normal width when the hall effect sensor is not aligned with the magnet.

In response to a determination that the display screen is not at the normal width, the boot up process is stopped and an error notice alert is provided at block 1408. In an example, the error notice alert may be any suitable type of alert including, but not limited to, an audio alert notifying an individual to push the display screen back to the normal width. In certain examples, the display screen may be push to the normal width in any suitable manner including, but not limited to, push knobs on a sliding frame component in physical communication with the display screen.

In response to a determination that the display screen is at the normal width, a counter is set to zero at block 1410. At block 1412, the information handling system is placed in an idle state. While the information handling system is in the idle state, a change in a display screen size is detected at block 1414. In an example, the change in the display screen size may be performed in any suitable manner including, but not limited to, a manual change via an individual, and a motor driver.

At block 1416, a number of steps from a previous display screen size to a new display screen size are counted. In an example, the number of steps may be counted by a rotary encoder. At block 1418, the counter value is set based on the counted number of steps. In an example, the counter value may be updated or set from zero to a new value substantially equal to the counted number of steps. At block 1420, a panel active area is set based on the counter value, and the method ends at block 1422. In certain examples, the method may continue as state above at block 1414. In an example, the panel active area may be set, adjusted, or changed in any suitable manner including, but not limited to, changing the aspect ratio for images displayed on the display screen.

Figure 15:
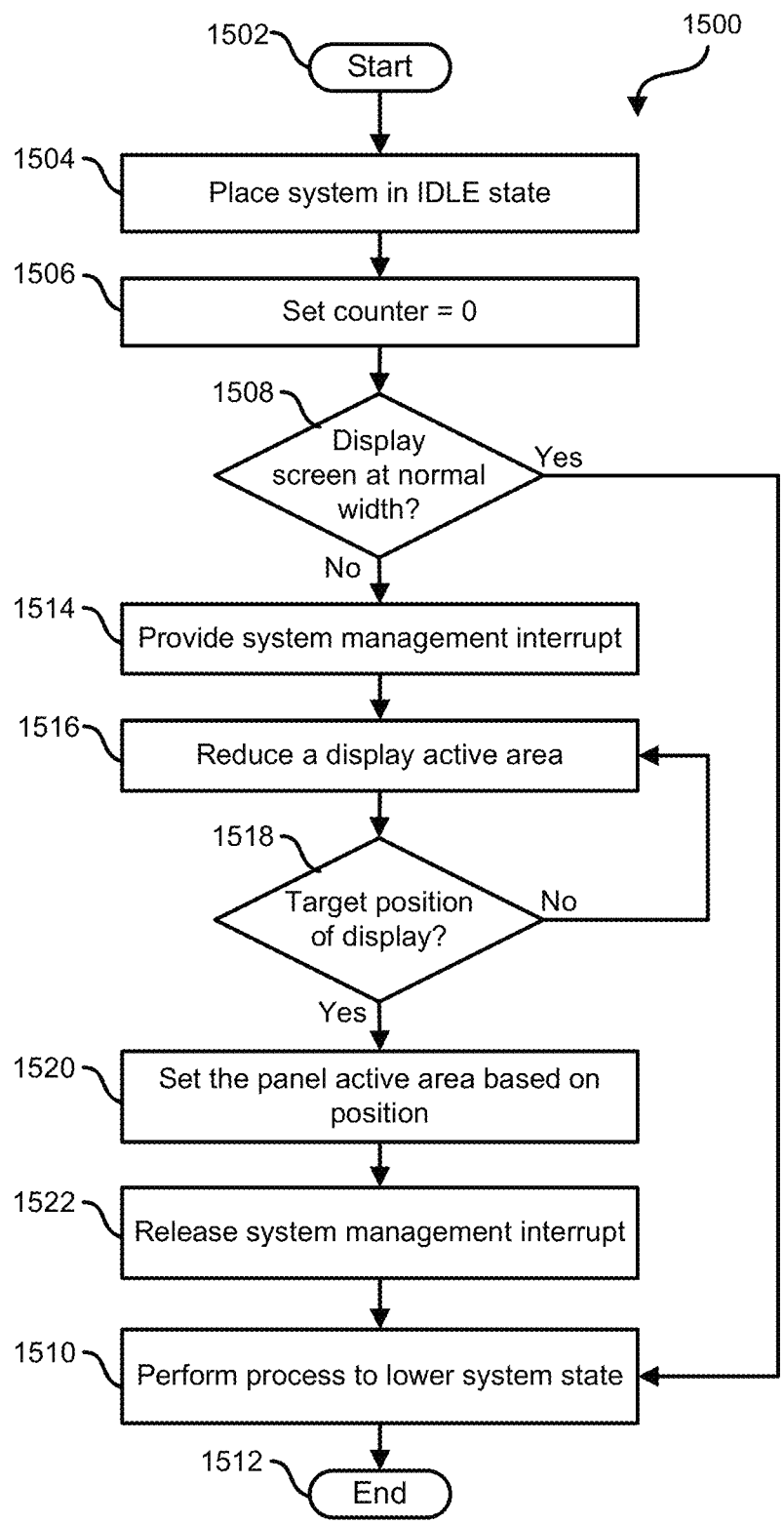
FIG. 15 is a flow diagram of another method for scrolling an expandable display screen according to at least one embodiment of the current disclosure.

FIG. 15 is a flow diagram of a method 1500 for scrolling an expandable display screen according to at least one embodiment of the current disclosure, starting at block 1502. It will be readily appreciated that not every method step set forth in this flow diagram is always necessary, and that certain steps of the methods may be combined, performed simultaneously, in a different order, or perhaps omitted, without varying from the scope of the disclosure. FIG. 15 may be employed in whole, or in part, by information handling system 100 depicted in FIG. 1 or any other type of system, controller, device, module, processor, or any combination thereof, operable to employ all, or portions of, the method of FIG. 1.

At block 1504, an information handling system is placed in an idle state. At block 1506, a system shut down to a lower power state is triggered. At block 1508, a determination is made whether a display screen of the information handling system is at a normal width. In an example, the display screen may be incorporated within a display device of the information handling system. The width of the display screen may be determined in any suitable manner. For example, a status of a hall effect sensor flag may be checked to determine whether the display screen is at a normal width. In an example, the hall effect sensor flag may be set to a first value in response to a hall effect sensor being substantially aligned with a magnet on a sliding frame component, and the hall effect sensor to be set to a second value in response to the hall effect sensor not being aligned with the magnet. In certain examples, the display screen may be at a normal width when the hall effect sensor is substantially aligned with the magnet, and the display screen may be at a larger than normal width when the hall effect sensor is not aligned with the magnet.

If the display screen is at the normal width, the process to lower the system state is performed at block 1510, and the method ends at block 1512. If the display screen is not at the normal width, a system management interrupt (SMI) is provided at block 1514. In an example, the SMI may be utilized to stop the processor to perform the system shut down to a lower power state. At block 1516, an active display area is reduced. The active display area may be reduced in any suitable manner including, but not limited to, a driving motor reducing the width of the display device, and a manual reduction by a user of the information handling system. In an example, a message may be provided to the user indicating that the display screen needs to be returned to the normal width. The message may be any suitable type of message including, but not limited to, an audio message notifying an individual to push the display screen back to the normal width, and a visual message notifying an individual to push the display screen back to the normal width.

At block 1518, a determination is made whether the display screen is at a target position. In an example, the determination may be made by any suitable manner including, but not limited to, a current value of the counter being a predetermined value. In certain examples, the predetermined value may be zero. One of ordinary skill in the art would recognize that the zero is only one of any possible values for the predetermined value, and other values may be used without varying from the scope of this disclosure.

If the display screen is not in the target position, the flow continues as stated above at block 1516. If the display screen is in the target position, a panel active area is set based on the position of the display screen at block 1520. For example, if counter indicates that the position is in the normal width, the panel active area may be set to a default size, aspect ratio, and resolution. At block 1522, the SMI is released. At block 1510, the process to lower the system state is performed, and the method ends at block 1512.

Referring back to FIG. 1, the information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A display device for an information handling system, the display device comprising:
   a flexible display screen adjustable between a plurality of sizes;
   a display holder in physical communication with the flexible display screen, the display holder including first and second foldable portions, wherein the first and second foldable portions are located on distal ends of the display holder; and
   a sliding frame component in physical communication with the display holder, the sliding frame component to adjust the size of the flexible display screen, wherein the display holder is located in between the flexible display screen and the sliding frame component, the sliding frame component including:
      first and second sliding frames, the first sliding frame including a first adjustment component, and the second sliding frame including a second adjustment component; and
      a gear in physical communication with and located in between the first and second adjustment components, the gear to guide the first and second sliding frames.

2. The display device of claim 1, wherein the first sliding frame further includes:
   a first knob to enable an individual to manually slide the first sliding frame away from or toward a mid-line of the sliding frame component.

3. The display device of claim 1, wherein the display holder further includes a center metal backer portion in physical communication with and located in between the first and second foldable portions.

4. The display device of claim 1, further comprising:
   a cover in physical communication with the sliding frame component, the cover includes:
      a gear holder to interface with the gear of the sliding frame component; and
      a rotary encoder in physical communication the first adjustment component, the rotary encoder to record an open location of the display device.

5. The display device of claim 4, wherein a screen resolution of the flexible display screen is dynamically adjusted based on the recorded open location of the display device.

6. The display device of claim 1, further comprising:
   a display controller board to provide display controls to the flexible display screen, the display controller board includes a hall effect sensor.

7. The display device of claim 6, wherein the first sliding frame further includes:
   a magnet to align with the hall effect sensor of the display controller board, wherein when the magnet is aligned with the hall effect sensor, the display device is in a full retracted position.

8. The display device of claim 1, further comprising:
   a motor in physical communication with the gear, the motor to drive the gear to adjust the size of the flexible display screen.

9. An information handling system comprising:
   a keyboard; and
   a display device in communication with the keyboard, the display device including:
      a display a flexible display screen adjustable between a plurality of sizes;
      a display holder in physical communication with the flexible display screen, the display holder including first and second foldable portions, wherein the first and second foldable portions are located on distal ends of the display holder;
      a sliding frame component in physical communication with the display holder, the sliding frame component to adjust the size of the flexible display screen, wherein the display holder is located in between the flexible display screen and the sliding frame component, the sliding frame component including:
  a first sliding frame including a first adjustment component, and a second sliding frame including a second adjustment component; and
  a gear in physical communication with and located in between the first and second adjustment components, the gear to guide the first and second sliding frames; and
a cover in physical communication with the sliding frame component, the cover including:
  first and second rails, the first rail in physical communication with the first adjustment component, and the second rail in physical communication with the second adjustment component, the first rail guiding the first adjustment component and the second rail guiding the second adjustment component.

10. The information handling system of claim 9, wherein the first sliding frame further includes:
  a first knob to enable an individual to manually slide the first sliding frame away from or toward a mid-line of the sliding frame component.

11. The information handling system of claim 9, wherein the display holder further includes a center metal backer portion in physical communication with and located in between the first and second foldable portions.

12. The information handling system of claim 9, further comprising:
  a cover in physical communication with the sliding frame component, the cover includes:
    a gear holder to interface with the gear of the sliding frame component; and
    a rotary encoder in physical communication the first adjustment component, the rotary encoder to record an open location of the display device.

13. The information handling system of claim 12, wherein a screen resolution of the flexible display screen is dynamically adjusted based on the recorded open location of the display device.

14. The information handling system of claim 9, further comprising:
  a display controller board to provide display controls to the flexible display screen, the display controller board includes a hall effect sensor.

15. The information handling system of claim 14, wherein the first sliding frame further includes:
  a magnet to align with the hall effect sensor of the display controller board, wherein when the magnet is aligned with the hall effect sensor, the display device is in a full retracted position.

16. The information handling system of claim 9, further comprising:
  a motor in physical communication with the gear, the motor to drive the gear to adjust the size of the flexible display screen.

* * * * *